United States Patent
Suresh et al.

(10) Patent No.: US 12,316,735 B2
(45) Date of Patent: May 27, 2025

(54) TECHNOLOGIES FOR MEMORY AND I/O EFFICIENT OPERATIONS ON HOMOMORPHICALLY ENCRYPTED DATA

(71) Applicant: Intel Corporation, Santa Clara, CA (US)

(72) Inventors: Vikram B. Suresh, Portland, OR (US); Rosario Cammarota, San Diego, CA (US); Sanu K. Mathew, Portland, OR (US); Zeshan A Chishti, Beaverton, OR (US); Raghavan Kumar, Hillsboro, OR (US); Rafael Misoczki, Miami Beach, FL (US)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 17/133,711

(22) Filed: Dec. 24, 2020

(65) Prior Publication Data

US 2021/0119766 A1 Apr. 22, 2021

(51) Int. Cl.
*G06F 21/60* (2013.01)
*G06F 12/0802* (2016.01)
(Continued)

(52) U.S. Cl.
CPC .......... *H04L 9/008* (2013.01); *G06F 12/0802* (2013.01); *G06N 20/00* (2019.01); *G06F 2212/60* (2013.01)

(58) Field of Classification Search
CPC . H04L 9/008; H04L 2209/12; G06F 12/0802; G06F 2212/60; G06F 2207/4824;
(Continued)

(56) References Cited

U.S. PATENT DOCUMENTS

2013/0216044 A1* 8/2013 Gentry .................... H04L 9/008
 380/277
2019/0312728 A1* 10/2019 Poeppelmann ....... H04L 9/3093
(Continued)

FOREIGN PATENT DOCUMENTS

EP 4170959 A1 * 4/2023 ........... G06F 21/602

OTHER PUBLICATIONS

Tianying Xie; Hayato Yamana; Tatsuya Mori; "CHE: Channel-Wise Homomorphic Encryption for Ciphertext Inference in Convolutional Neural Network"; Year: Sep. 2022 | vol. 10 | Journal Article | Publisher: IEEE; pp. 107446-107458 (Year: 2022).*
(Continued)

*Primary Examiner* — Fatoumata Traore
*Assistant Examiner* — Courtney D Fields
(74) *Attorney, Agent, or Firm* — Nicholson De Vos Webster & Elliott LLP (57) ABSTRACT

Technologies for memory and I/O efficient operations on homomorphically encrypted data are disclosed. In the illustrative embodiment, a cloud compute device is to perform operations on homomorphically encrypted data. In order to reduce memory storage space and network and I/O bandwidth, ciphertext blocks can be manipulated as data structures, allowing operands for operations on a compute engine to be created on the fly as the compute engine is performing other operations, using orders of magnitude less storage space and bandwidth.

11 Claims, 8 Drawing Sheets

(51) Int. Cl.
*G06N 20/00* (2019.01)
*H04L 9/00* (2022.01)
*G06F 21/33* (2013.01)
*H04L 9/06* (2006.01)

(58) Field of Classification Search
CPC ........ G06F 7/552; G06F 21/602; G06F 21/78; G06N 20/00; G09C 1/00
See application file for complete search history.

(56) References Cited

U.S. PATENT DOCUMENTS

| | | | |
|---|---|---|---|
| 2020/0220851 A1* | 7/2020 | Storm | H04L 9/0625 |
| 2021/0344479 A1* | 11/2021 | Lee | H04L 9/3093 |

OTHER PUBLICATIONS

Albrecht, Martin et al. "Homomorphic Encryption Standard." Nov. 21, 2018, homomorphicencryption.org/wp-content/uploads/2018/11/HomomorphicEncryptionStandardv1.1.pdf. 33 pages.

Brutzkus, Alon, et al. "Low Latency Privacy Preserving Inference." ArXiv.org, Jun. 7, 2019, arxiv.org/abs/1812.10659. 18 Pages.

Dathathri, Roshan et al. "CHET: An Optimizing Compiler for Fully-Homomorphic Neural-Network Inferencing (PLDI 2019—PLDI Research Papers)." PLDI 2019, Jun. 24, 2019, pldi19.sigplan.org/details/pldi-2019-papers/8/CHET-An-Optimizing-Compiler-for-Fully-Homomorphic-Neural-Network-Inferencing. 15 Pages.

Jung, Wonkyung, et al. "HEAAN Demystified: Accelerating Fully Homomorphic Encryption Through Architecture-Centric Analysis and Optimization." ArXiv.org, Mar. 10, 2020, arxiv.org/abs/2003.04510. 15 pages.

M. Sadegh Riazi, Kim Laine, Blake Pelton, and Wei Dai. 2020. "HEAX: An Architecture for Computing on Encrypted Data." In Proceedings of the Twenty-Fifth International Conference on Architectural Support for Programming Languages and Operating Systems (ASPLOS '20), Mar. 16-20, 2020, Lausanne, Switzerland. ACM, New York, NY, USA, 15 pages. https://doi.org/10.1145/3373376.3378523.

Arita, Seiko, et al.; "Fully Homomorphic Encryption Scheme Based on Decomposition Ring," IEICE Trans. Fundamentals, vol. E.103-A.No.1, Jan. 2020; 18 pages.

EPO; Extended European Search Report issued in EP Patent Application No. 21196385.5, dated Feb. 21, 2022; 8 pages.

Riazi, M. Sadegh, et al.; "HEAX: High-Performance Architecture for Computation on Homomorphically Encrypted Data in the Cloud," arxiv.org, Cornell University Library, Sep. 21, 2019; 18 pages.

Zucca, Vincent; "Towards Efficient Arithmetic for Ring-LWE based Homomorphic Encryption," retrieved from the Internet at https://www.theses.fr/2018SORUS080.pdf; Sorbonne University; Jun. 25, 2018; 160 pages.

European Search Report and Search Opinion, EP App. No. 21196385.5, Feb. 21, 2022, 7 pages.

* cited by examiner

TECHNOLOGIES FOR MEMORY AND I/O EFFICIENT OPERATIONS ON HOMOMORPHICALLY ENCRYPTED DATA

BACKGROUND

Strong encryption can ensure that no one can read encrypted data, allowing for encrypted data to be sent across unencrypted channels and stored in untrusted storage without risk of the data being accessed. However, standard encryption does not allow for encrypted data to be analyzed or processed without first being decrypted, preventing an untrusted device from processing data in a secure manner.

Homomorphic encryption can allow for processing of encrypted information without the data first being decrypted. However, memory and input/output bandwidth requirements can be orders of magnitude higher for homomorphically encrypted data than for the corresponding unencrypted data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
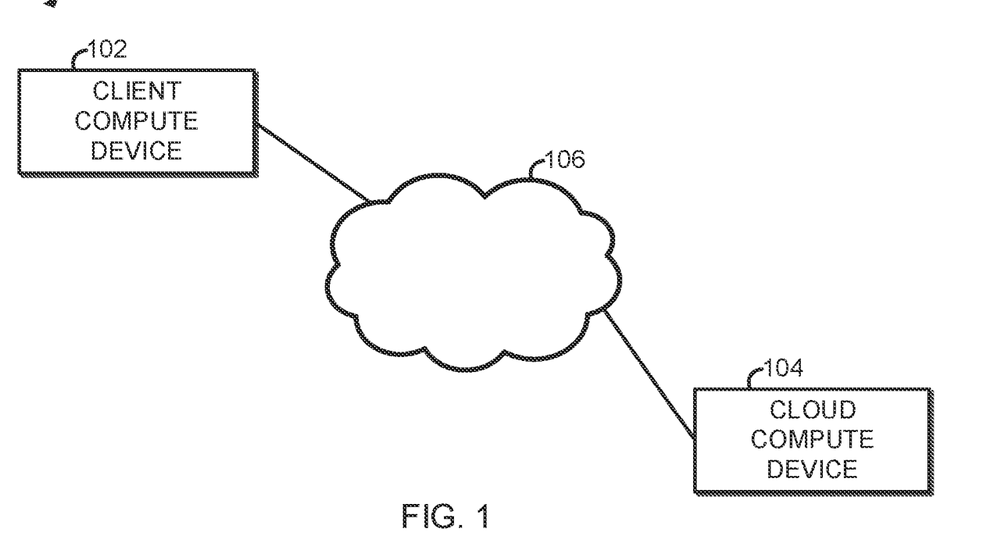
FIG. 1 is a simplified block diagram of at least one embodiment of a system for remote processing by a cloud compute device of data homomorphically encrypted by a client compute device.

Referring now to FIG. 1, an illustrative system 200 includes a client compute device 102 connected to a cloud compute device 104 over a network 206. In the illustrative embodiment, the client compute device 102 determines a workload to be sent to the cloud compute device 104 for remote execution, such as image recognition. The client compute device 102 determines parameters for the workload, such as filters to be used in a convolutional neural network (CNN). The client compute device 102 can pack multiple parameters for the workload into a ciphertext block, even though the parameters in a single ciphertext block may be used in different operations on the cloud compute device 104. For example, the client compute device 102 may pack several filters for a CNN in a single ciphertext block, and the cloud compute device 104 may apply only one filter at a time, as discussed in more detail below. The client compute device 102 then sends the homomorphically encrypted parameters to the cloud compute device 104 over the network 106 along with an indication of the workload to be performed with the encrypted parameters.

The network 106 connecting the client compute device 102 to the cloud compute device 104 may be any suitable network or combination of networks. For example, the network 106 may be any combination of an internet, an intranet, an ethernet-based network, a TCP/IP network, an edge network, etc.

The illustrative cloud compute device 104 receives the homomorphically encrypted workload parameters in one or more ciphertext blocks along with the indication of the workload to be performed. The cloud compute device 104 may perform various shapeshifting operations on ciphertext blocks in order to create operands for instructions to be executed as part of the workload. The cloud compute device 104 may, e.g., copy a cipher value from one slot of a ciphertext block into every text of a ciphertext block. After performing the workload, the cloud compute device 104 sends the encrypted result back to the client compute device 102.

Figure 4:
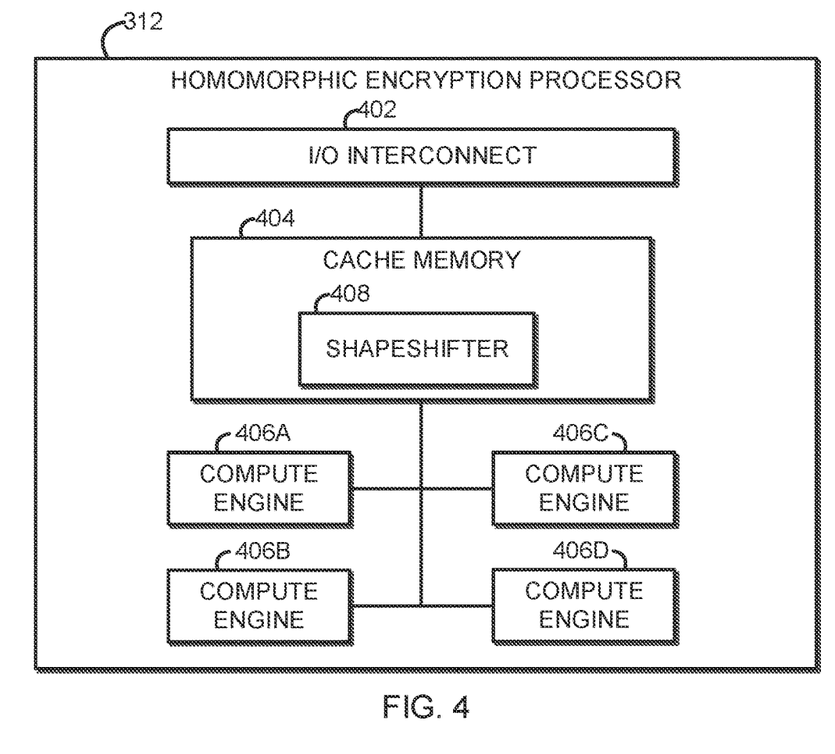
FIG. 4 is a simplified block diagram of at least one embodiment of the homomorphic encryption processor of FIG. 3.

In the illustrative embodiment, the cloud compute device 104 includes a shapeshifter 408 in a cache memory 404 (see FIG. 4). The shapeshifter 408 may operate as a pipeline for operations on the ciphertext. For example, a compute engine 406 may instruct the shapeshifter 408 to create an operand for a future instruction while the compute engine 406 performs another operation. The shapeshifter 408 can prepare the operand so that it is ready It should be appreciated that such an approach can both significantly reduce memory and input/output requirements as well as reduce latency and execution time. As operands for operations on homomorphically encrypted data can take orders of magnitude more space than unencrypted operands, sending the operands in an unpacked form can also require orders of magnitude more space and bandwidth than sending unencrypted operands. By creating operands on the fly from ciphertext blocks packed with several parameters, the storage and bandwidth requirements for storing and sending large operands can be reduced.

The client compute device 102 and cloud compute device 104 may use any suitable homomorphic encryption algorithm, such as any lattice-based homomorphic encryption algorithm. In the illustrative example, the encryption algorithm is based on the ring learning with errors problem. The encryption algorithm may be any suitable implementation of an encryption algorithm based on the ring learning with errors problem, such as a Brakerski-Gentry-Vaikuntanathan (BGV) scheme, a Brakerski/Fan-Vercauteren (BFV) scheme, or a Cheon-Kim-Kim-Song (CKKS) scheme. The ring learning with errors problem is the learning with errors problem specialized to polynomial rings over finite fields. A polynomial ring is defined as $R_q(X)=Z_q/F(X)$, where $F(X)$ is a cyclotomic polynomial of degree N.

In the illustrative encryption algorithm, data in a finite field Fp is encrypted using two polynomial rings of degree N with a coefficient modulus q, with q>>p. The value for p may be any suitable value and may depend on the particular application and plaintext data to be encrypted. For example, in one embodiment, data elements to be encrypted may be 8 bits wide, and p may be $2^8-1$ (255). In order to achieve a certain level of security, such as 128-bit security, polynomials with a high degree and large coefficients are used, such as polynomials with degree N>8,192 and coefficient length greater than 206 bits (i.e., $q>2^{206}$). For example, in one embodiment, the degree may be 16,384, and each coefficient may have 412 bits. As a result, in order to encode a single parameter, the two polynomial rings of degree 16,384 and coefficient bit-length of 412 bits requires 2×16,384×413 bits=1.7 megabytes. A plaintext block of 1.7 megabytes can be encoded to a ciphertext block of 1.7 megabytes. However, in order to encode, for example, a plaintext parameter one byte in width, the ciphertext block would still need to be 1.7 megabytes, an increase in size of the ciphertext over the plaintext of $10^6$. Such an approach would massively increase the memory requirement, cache storage requirements, network bandwidth, interconnect bandwidth, power usage, etc.

In order to avoid the high performance penalty of encoding each parameter into a ciphertext block that is orders of magnitude larger than the parameter, multiple parameters can be encoded in a single ciphertext block. Using the Chinese Reminder Theorem (CRT), F(X) can be factorized modulo p into r smaller factors, $F_1(X), F_2(X) \ldots F_r(X)$, each of degree d and coefficient of size $\log_2(p)$ bits. The degree d may be any suitable value less than or equal to the degree N, such as a degree d=8,192 when using degree N=16,384. Each of the polynomial factors $F_i(X)$ can be considered as a separate slot that can be used to represent one input data as a plaintext polynomial $R_{i,p}(X)$. The r plaintext polynomials can be combined to obtain a packed polynomial $R_q(X)$ whose encryption generates a ciphertext that effectively encrypts all the plaintext slots. Operations on the packed ciphertext operate on each slot independently, similar to a single instruction multiple data (SIMD) approach, resulting in r parallel computations. Any operation on two packed ciphertexts requires the number of slots to be identical and operands aligned in appropriate slots.

Figure 2:
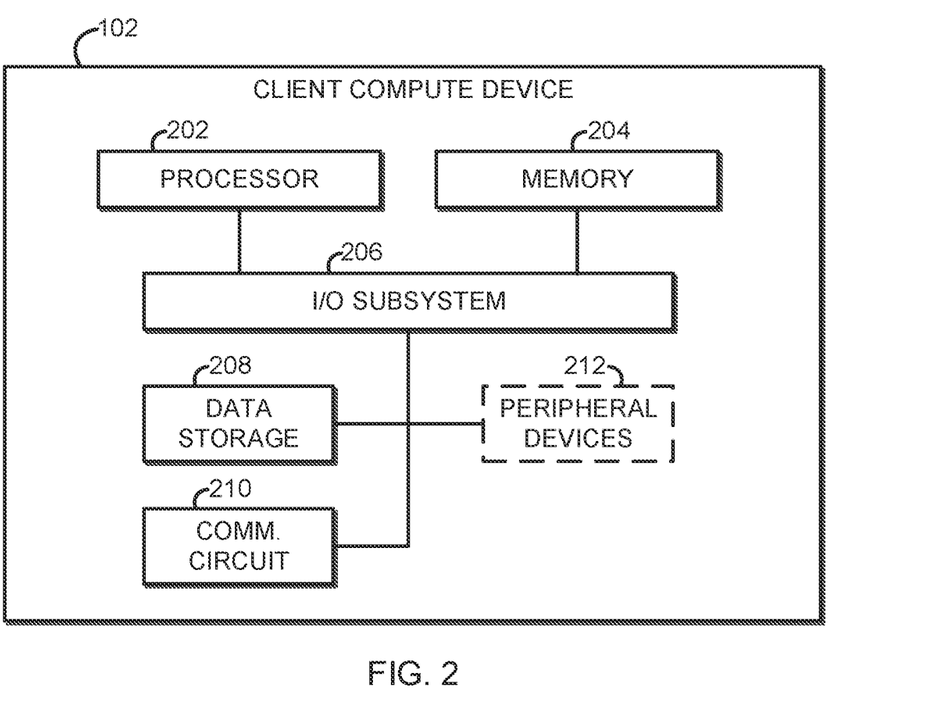
FIG. 2 is a simplified block diagram of at least one embodiment of the client compute device of FIG. 1.

Referring now to FIG. 2, the client compute device 102 may be embodied as any type of compute device. For example, the client compute device 102 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. The illustrative client compute device 102 includes a processor 202, a memory 204, an input/output (I/O) subsystem 206, data storage 208, a communication circuit 210, and one or more peripheral devices 212. In some embodiments, one or more of the illustrative components of the client compute device 102 may be incorporated in, or otherwise form a portion of, another component. For example, the memory 204, or portions thereof, may be incorporated in the processor 202 in some embodiments. In some embodiments, one or more of the illustrative components may be physically separated from another component. For example, in one embodiment, an SoC with a processor 202 and memory 204 may be connected by a universal serial bus (USB) connector to a data storage 208 that is external to the SoC.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the client compute device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the client compute device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 206 may connect various internal and external components of the client compute device 102 to each other with use of any suitable connector, interconnect, bus, protocol, etc., such as PCIe®, USB2, USB3, USB4, NVMe®, Thunderbolt®, and/or the like. In some embodiments, the I/O subsystem 206 may provide power to an external device, such as bus-powered USB devices. In some embodiments, the I/O subsystem 206 may form a portion of a system-on-a-chip (SoC) and be incorporated, along with the processor 202, the memory 204, and other components of the client compute device 102 on a single integrated circuit chip.

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

The communication circuit 210 may be embodied as any type of interface capable of interfacing the client compute device 102 with other compute devices, such as over one or more wired or wireless connections. In some embodiments, the communication circuit 210 may be capable of interfacing with any appropriate cable type, such as an electrical cable or an optical cable. The communication circuit 210 may be configured to use any one or more communication technology and associated protocols (e.g., Ethernet, Bluetooth®, WiMAX, near field communication (NFC), etc.). The communication circuit 210 may be located on silicon separate from the processor 202, or the communication circuit 210 may be included in a multi-chip package with the processor 202, or even on the same die as the processor 202. The communication circuit 210 may be embodied as one or more add-in-boards, daughtercards, network interface cards, controller chips, chipsets, specialized components such as a field programmable gate array (FPGA) or application specific integrated circuit (ASIC), or other devices that may be used by the client compute device 102 to connect with another compute device. In some embodiments, communication circuit 210 may be embodied as part of a system-on-a-chip (SoC) that includes one or more processors, or included on a multichip package that also contains one or more processors. In some embodiments, the communication circuit 210 may include a local processor (not shown) and/or a local memory (not shown) that are both local to the communication circuit 210. In such embodiments, the local processor of the communication circuit 210 may be capable of performing one or more of the functions of the processor 202 described herein. Additionally or alternatively, in such embodiments, the local memory of the communication circuit 210 may be integrated into one or more components of the client compute device 102 at the board level, socket level, chip level, and/or other levels.

In some embodiments, the client compute device 102 may include other or additional components, such as those commonly found in a compute device. For example, the client compute device 102 may also have peripheral devices 212, such as a graphics processor, a display, a keyboard, a mouse, a speaker, a microphone, a camera, an external storage device, etc. In some embodiments, the client compute device 102 may be connected to a dock that can interface with various devices, including peripheral devices 212.

Figure 3:
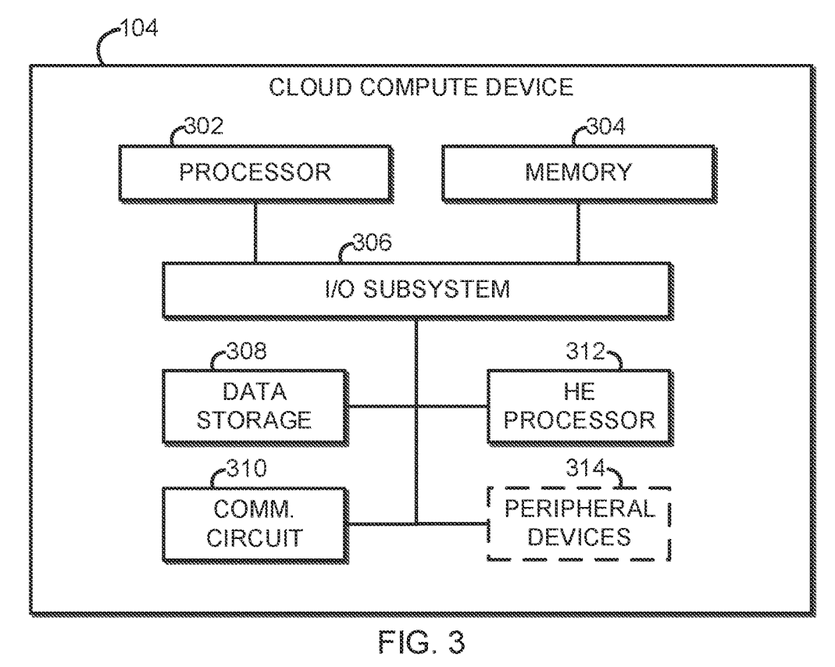
FIG. 3 is a simplified block diagram of at least one embodiment of the cloud compute device of FIG. 1.

Referring now to FIG. 3, the cloud compute device 104 may be embodied as any type of compute device. For example, the cloud compute device 104 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. In some embodiments, the cloud compute device 104 may be a disaggregated collection of components, such as different components on different sleds in a rack of a data center.

The illustrative cloud compute device 104 may include similar components as the client compute device 102, such as a processor 302, a memory 304, an I/O subsystem 306, data storage 308, a communication circuit 310, and optional peripheral devices 314, each of which may be similar to the corresponding component of the client compute device 102 described above. The description of those components will not be repeated in the interest of clarity. Of course, it should be appreciated that the components of the cloud compute device 104 may vary in quality or quantity from the corresponding component of the client compute device 102. For example, in one embodiment, the cloud compute device 104 may have a relatively powerful processor 302 and a relatively large amount of memory 304, while the client compute device 102 may have a less powerful processor 202 and a smaller amount of memory 302.

In addition, in the illustrative embodiment, the cloud compute device 104 includes a homomorphic encryption (HE) processor 312. The HE processor 312 is configured to perform processing tasks on data that is encrypted using a homomorphic encryption algorithm. It should be appreciated that, in the illustrative embodiment, the HE processor 312 does not need to decrypt the data in order to perform processing tasks on the data.

Referring now to FIG. 4, the HE processor 312 has an I/O interconnect 402, a cache memory 404, and one or more compute engines 406, such as compute engines 406A-D. The illustrative interconnect 402 may connect to or interface with one or more components or circuits outside of the HE processor 312, such as the I/O subsystem 306. In the illustrative embodiment, the I/O interconnect 402 of the HE processor 312 is connected to the I/O subsystem 106 and other components of the cloud compute device 104, such as the processor 302, the memory 304, etc.

The cache memory 404 is configured to receive data from other components of the cloud compute device 104, such as from the memory 304 or the processor 302. The cache memory 404 may receive data when it is requested for use by one of the compute engines 406. The compute engines 406 may request data when the data is required or may request the data before it is needed in order to allow time for the data to be loaded in the cache memory 404.

In some embodiments, the cache memory 404 may include various components to control memory access, manage cache contents, handle cache misses, perform evictions, etc. For example, the cache memory 404 may include or interface with a memory management unit, a translation lookaside buffer, and/or the like. In some embodiments, the cache memory 404 may form a part of or be integrated with the memory 304.

The cache memory 404 includes a shapeshifter 408. The shapeshifter 408 is configured to modify and generate ciphertext blocks to be used as operands for the compute engines 406, as described in more detail below. The shapeshifter 408 may be embodied as, e.g., hardware, software, firmware, or a combination thereof. The shapeshifter 408 may be embodied as shapeshifter circuitry, which may be any suitable collection of circuitry or electrical devices. In some embodiments, a shapeshifter circuitry may be partially or fully embodied as a processor and memory. In some embodiments, the shapeshifter circuitry may form a portion of another component of the compute device, such as the processor 302 and/or the memory 304.

Each compute engine 406A-D is configured to perform operations on ciphertext blocks. In the illustrative embodiment, each compute engine 406A-D may perform operations such as addition and multiplication on two operands embodied as ciphertext blocks and/or perform operations such as addition and multiplication on more operands embodied as a ciphertext block and one operand embodied as a plaintext block. As discussed above, in the illustrative embodiment, each ciphertext block includes several slots, and the compute engine 406A-D may perform operations on each slot of each operand. For example, the compute engine 406A-D may multiply the value of each slot of a ciphertext block a first operand by the value of the corresponding slot of ciphertext block a second operand as part of a single multiplication instruction, similar to a single instruction multiple data (SIMD) instruction.

Each compute engine 406 may be embodied as any type of compute engine or processor capable of performing the functions described herein. For example, the compute engine may be embodied as a single or multi-core processor(s), a single or multi-socket processor, a digital signal processor, a graphics processor, a microcontroller, and/or other processor or processing/controlling circuit. A compute engine 406 may be embodied as a field-programmable gate array (FPGA), an application specific integrated circuit (ASIC), a graphics processor, a vector processor, etc. The illustrative compute engine 406 may have circuits designed to perform operations on homomorphically encrypted data. In the illustrative embodiment, the compute engine 406 may be configured to operate on operands that have a width equal to a ciphertext block. The compute engine 406 may, in some embodiments, be able operate on operands of different widths, such as operands that correspond to a cipher block for various values of the parameters of the encryption algorithm, such as various values of N and q. The compute engine 406 may additionally include circuitry that can perform tasks in a similar manner as the processor 202. For the compute engine 406 may include a 32-bit or 64-bit processor core in addition to a processor core configured to perform operations on homomorphically encrypted data.

In operation, each compute engine 406A-D may request operands from the cache memory 404. If the data for the operands is stored in the cache memory 404, the cache memory 404 can provide it to the requesting compute engine 406. If the data for the operands is not stored in the cache memory 404, the cache memory 404 may request the data from another component of the cloud compute device, such as the memory 304 or the processor 302.

In the illustrative embodiment, the shapeshifter 408 is configured to generate operands for the compute engine 406 based on data stored in the cache memory 404. As discussed above, each ciphertext block may include several slots that can be operated on in parallel. However, the cache memory 404 may store encrypted values in a different arrangement in ciphertext blocks that what is requested by a compute engine 406. For example, a compute engine 406 may request an operand with that has the value from a single slot in a ciphertext block repeated multiple time, while the ciphertext block only has that value in a single slot. The shapeshifter 408 may perform operations to copy the value from the single slot of the ciphertext block to several blocks of the ciphertext slot. More generally, the shapeshifter 408 may copy, move, shift, apply a mask to, etc. values from slots of ciphertext blocks in any suitable manner for any suitable reason. For example, in one embodiment, a ciphertext block may be used as a data structure for storing values, such as a stack, a queue. Additionally or alternatively, in another embodiment, a ciphertext block may be used as a random access data structure.

The shapeshifter 408 may prepare operands and otherwise generate or manipulate ciphertext blocks based on any suitable trigger. For example, in the illustrative embodiment, a compute engine 406 may instruct the shapeshifter 408 to create a ciphertext block for use by the compute engine 406 as an operand at a later time. The compute engine 406 may indicate to the shapeshifter 408 which slots of which ciphertext blocks should be included in the operand. Additionally or alternatively, the shapeshifter 408 may generate ciphertext blocks to use as operands based on temporal or spatial locality of other operands being requested. For example, in one embodiment, a compute device 406 may request an operand filled with a single value from a slot in a ciphertext block copied to every slot of the operand. The shapeshifter 408 may generate another operand filled with a single value from the next slot in the same ciphertext block in anticipation of the compute device 406 requesting such an operand.

In the illustrative embodiment, the shapeshifter 408 may also copy, move, shift, apply a mask to, etc. values in slots of a result of a calculation of the compute engine 406. For example, the compute engine 406 may perform a calculation and save a result in a register as a ciphertext block. The compute engine 406 may then send the result back to the cache memory 404 for storage. The shapeshifter 408 may, e.g., copy values from different slots of the result to slots of different ciphertext blocks saved on the cache memory 404.

Figure 5:
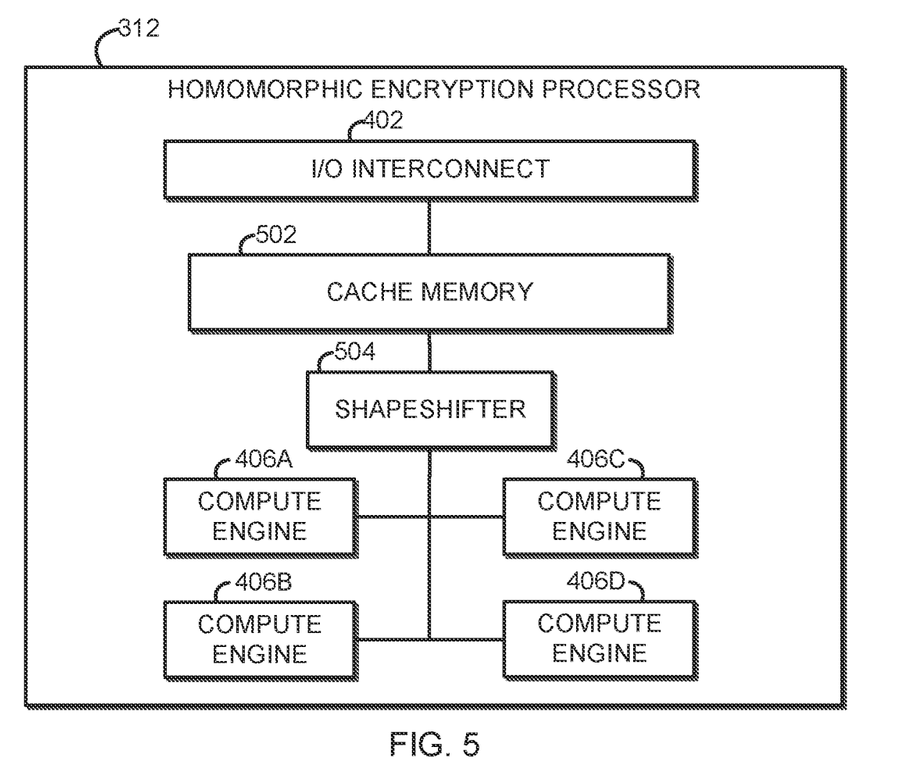
FIG. 5 is a simplified block diagram of at least one embodiment of the homomorphic encryption processor of FIG. 3.

It should be appreciated that the configuration shown in FIG. 4 is not the only possible configuration for a cache memory 404 and a shapeshifter 408. For example, in some embodiments, a shapeshifter 504 may be between a cache memory 502 and compute engines 406A-D, as shown in FIG. 5. The shapeshifter 504 may perform shapeshifting operations such as copying to or from slots of a ciphertext block, shift slots of a ciphertext block, or other packing or unpacking operations, either on data being sent from the cache memory 502 to a compute engine 406 or from a compute engine 406 to the cache memory 502.

Figure 6:
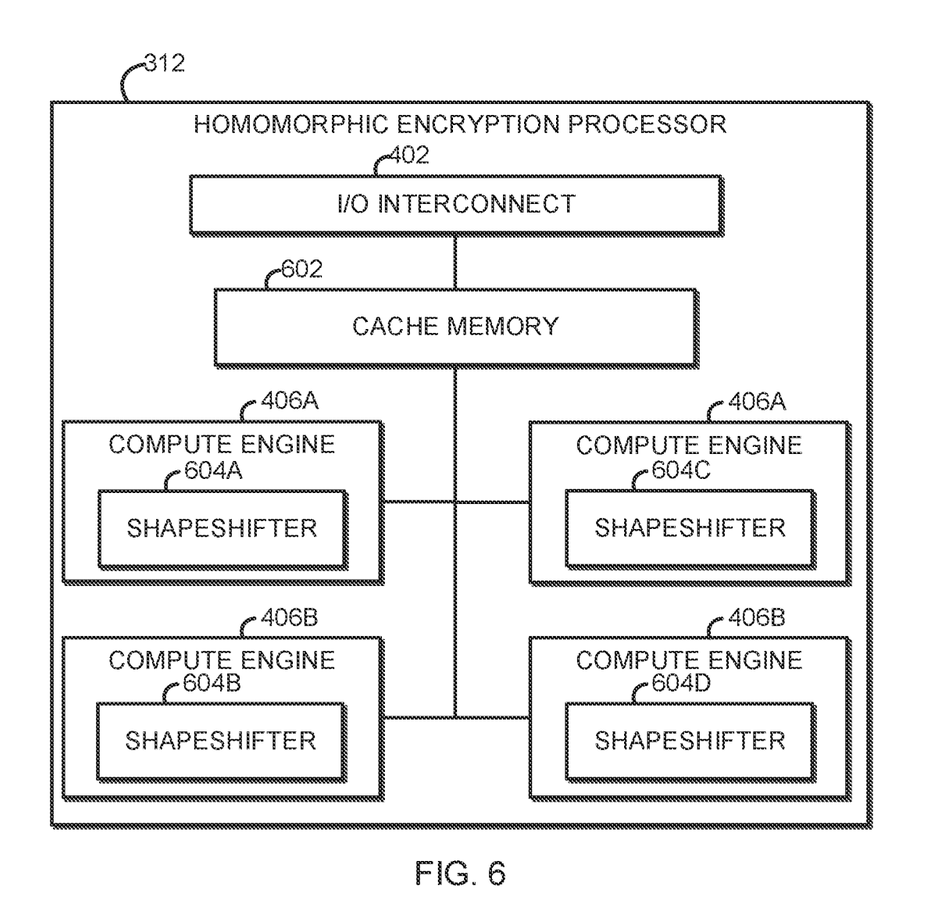
FIG. 6 is a simplified block diagram of at least one embodiment of the homomorphic encryption processor of FIG. 3.

In another embodiment, each compute engine 406A-D may include a shapeshifter 604A-D as shown in FIG. 6. The shapeshifter 604A-D may perform shapeshifting operations such as copying to or from slots of a ciphertext block, shift slots of a ciphertext block, applying a mask, or other packing or unpacking operations, either on data sent from the cache memory 602 prior to use by a compute engine 406 or on data that results from a computation on the compute engine 406. Such a configuration may be useful in workloads such as those using multiply-accumulate operations, where the pairs of operands that need to be multiplied can be compressed into a pair of ciphertext blocks and unpacked locally in the compute engine 406.

It should be appreciated that the shapeshifting operations performed by the shapeshifter 408 performs a similar role as pipelining in a processor. In particular, the compute engine 406 can indicate which operand will be needed in the future (either explicitly by, e.g., sending a request to the cache memory 404 or implicitly by, e.g., requesting temporally or spatially related operands), and the shapeshifter 408 can perform the necessary operations to prepare the operands prior to being sent to the compute engine 406 to be used in operations.

Figure 7:
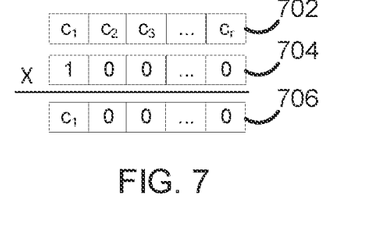
FIG. 7 is a simplified diagram showing an application of a mask to a ciphertext block.

Referring now to FIG. 7, in one embodiment, a component such as a shapeshifter 404 may a apply a mask 704 to a ciphertext block 702 as shown. In the illustrative embodiment, the first slot of the mask 704 is set to 1, while all other slots are set to 0. An input ciphertext block 702 can be multiplied by the mask 704 to generate a masked result 706, which is a ciphertext block 702 with the first slot set to the value of the first slot of the input ciphertext block 702 and all other slots set to 0.

Figure 8:
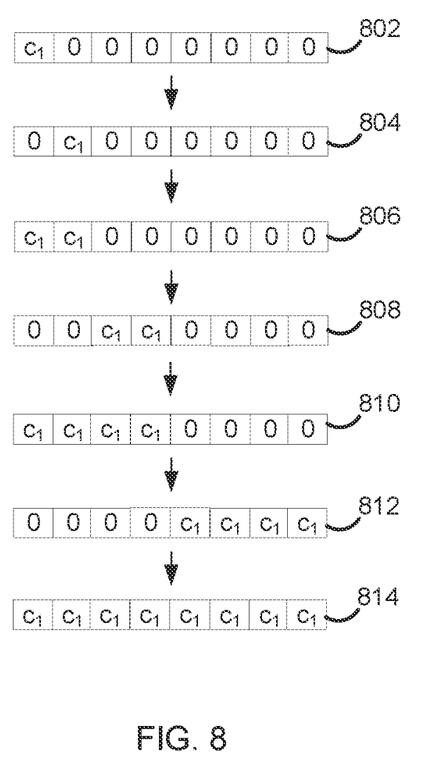
FIG. 8 is a simplified block diagram showing one embodiment of shapeshifting of a ciphertext block.

Referring now to FIG. 8, in one embodiment, a value in a first slot of an input ciphertext block 802 can be copied to all of the slots. First, a shift or rotate operation is applied to the input ciphertext block 802 to create the ciphertext block 804. Ciphertext block 802 is then added to ciphertext block 804 to create a ciphertext block 806 that has the value in the first slot of the initial ciphertext block 802 copied to the second slot. The rotate and add operations are then repeated twice more, resulting in a ciphertext block 814 with the value of the first slot of the input ciphertext block 802 copied to each slot of the ciphertext block 814. Although the ciphertext block 802 has eight slots, it should be appreciated that a ciphertext block may include a larger number of slots.

Figure 9:
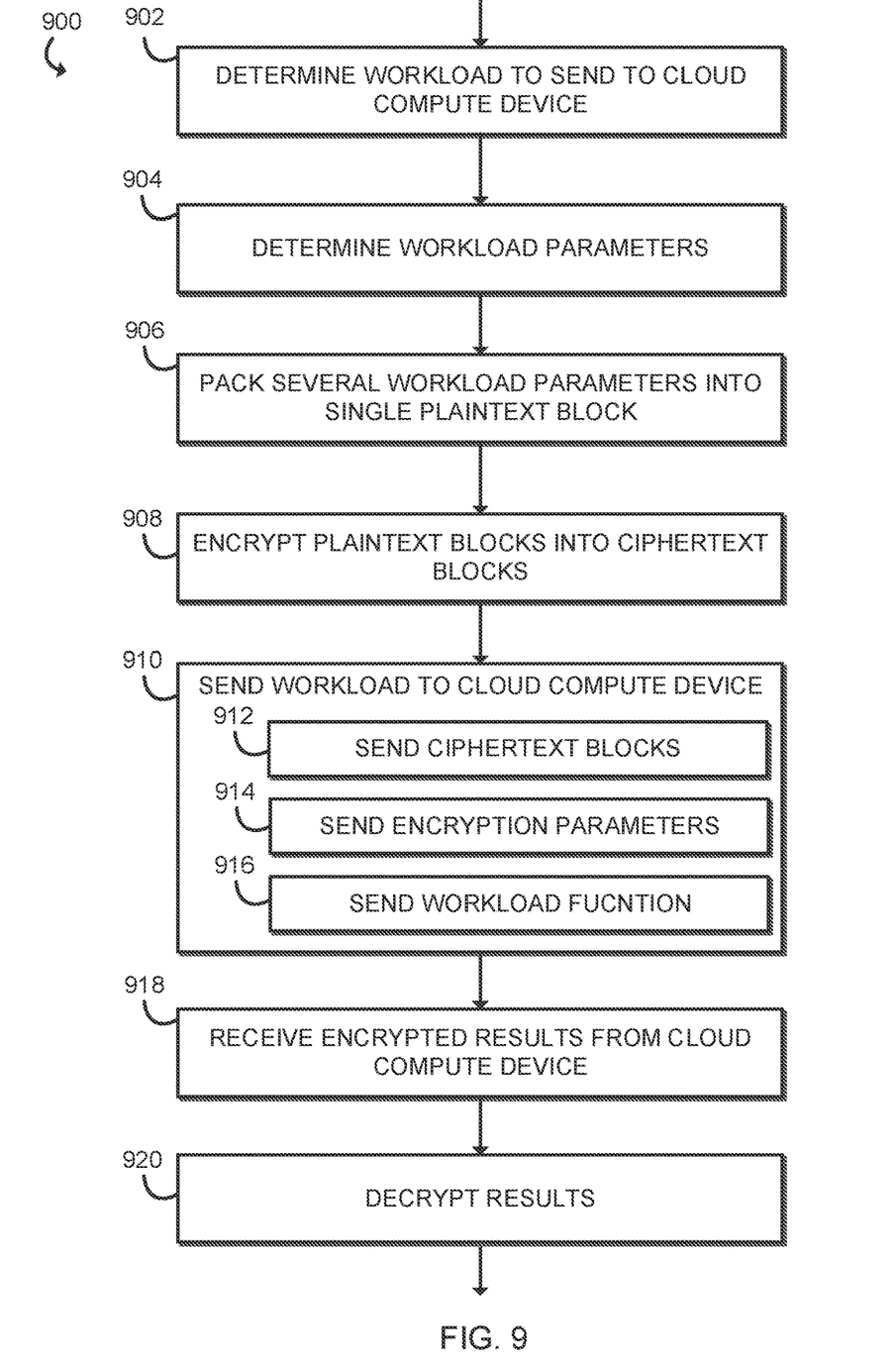
FIG. 9 is a simplified flow diagram of at least one embodiment of a method for sending homomorphically encrypted data to a remote compute device for processing that may be executed by the client compute device of FIG. 1.
Figure 10:
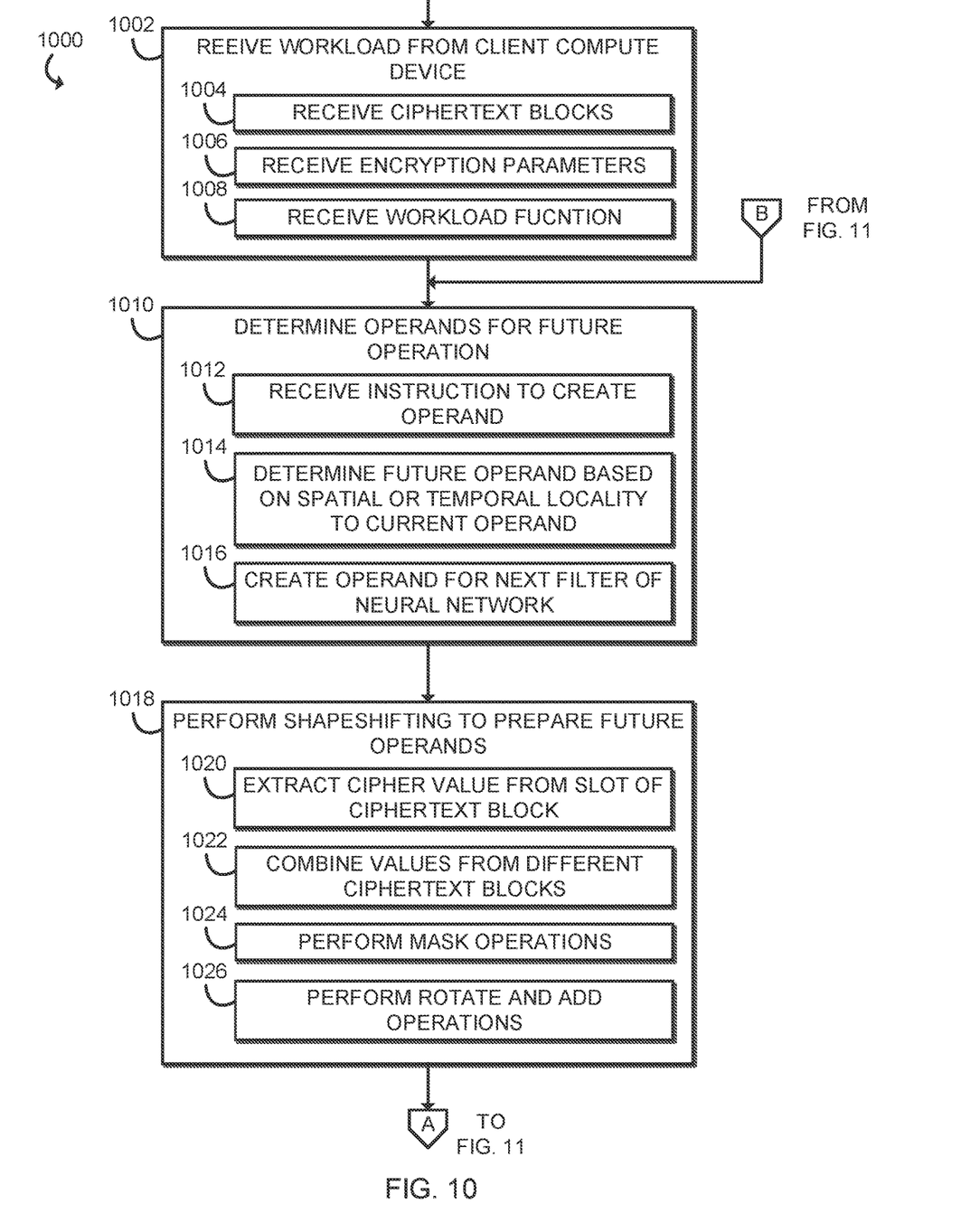
FIGS. 10-11 are a simplified flow diagram of at least one embodiment of a method for processing homomorphically encrypted data that may be executed by the cloud compute device of FIG. 1.

It should be appreciated that shapeshift operations are not limited to those shown in FIGS. 9 & 10. For example, shapeshift operations may create a ciphertext block that has the same value in each of the first half of the slots and a second value in each of the second half of the slots.

Referring now to FIG. 9, in use, the client compute device 102 may execute a method 900 for sending homomorphically encrypted data to a cloud compute device 104. The method 900 begins in block 902, in which the client compute device 102 determines a workload to send to a cloud compute device 104. The workload may be any suitable workload, such as an image recognition algorithm.

In block 904, the client compute device 102 determines workload parameters. The workload parameters may include input parameters, such as images that are to be processed. Additionally or alternatively, the workload parameters may include parameters for a function or a description of the function to be applied. In some embodiments, the cloud compute device 104 may store the function and/or some or all of the parameters of the function on the cloud compute device 104, in which case those parameters may not need to be sent to the cloud compute device 104. In one embodiment, the workload parameters may include one or more images to be processed as well as filters to be applied in a convolutional neural network to process the one or more images. In other embodiments, the workload may be any suitable workload, such as workloads involving linear algebra.

In block 906, the client compute device 102 packs several workload parameters into a single plaintext block. For example, the client compute device 102 may any combination of input values, function parameters, etc., in one plaintext block. It should be appreciated that the client compute device 102 may include in the same plaintext block values that are to be used in separate calculations. For example, in one embodiment, the plaintext block may include multiple filters for a convolutional neural network, while each filter is to be used in separate operations by the cloud compute device 104. In some embodiments, the client compute device 102 may pack several workload parameters into each of one or more plaintext blocks or may pack a single workload parameter into a plaintext block.

In block 908, the client compute device 102 encrypts each of the plaintext blocks using a homomorphic encryption algorithm to generate a corresponding ciphertext block for each plaintext block.

In block 910, the client compute device 102 sends the workload to the cloud compute device 104. The client compute device 102 may send the ciphertext blocks to the cloud compute device 104 in block 912. In the illustrative embodiment, the client compute device 102 may send certain encryption parameters to the cloud compute device 104 that the cloud compute device 104 can use to perform calculations on the homomorphically encrypted data, such as a polynomial degree and a number of bits used in each coefficient. It should be appreciated that, in the illustrative embodiment, the client compute device 102 does not send the encryption key to the cloud compute device 104, and, as a result, the cloud compute device 104 cannot decrypt or otherwise access the values of any of the plaintext blocks. In block 916, in the illustrative embodiment, the client compute device 102 sends the workload function to the cloud compute device 104.

In block 918, after the cloud compute device 104 performs some or all of the workload, the client compute device 102 receives the encrypted results from the cloud compute device 104. The client compute device 102 then decrypts the results in block 920.

Referring now to FIG. 10, in use, the cloud compute device 104 may execute a method 1000 for performing operations on homomorphically encrypted data. The method 1000 begins in block 1002, in which the cloud compute device 104 receives a workload from a client compute device 102. The cloud compute device 104 may receive one or more ciphertext blocks in block 1004. The ciphertext blocks may include one or more workload parameters for the workload to be performed, such as input values, function parameters, etc. In block 1006, the cloud compute device 104 may receive one or more encryption parameters that the cloud compute device 104 can use to perform calculations on the homomorphically encrypted data, such as a polynomial degree and a number of bits used in each coefficient. In block 1008, in the illustrative embodiment, the cloud compute device 104 receives the workload function to the cloud compute device 104. In some embodiments, the workload function and/or parameters of the workload function may be stored on the cloud compute device 104.

In block 1010, the cloud compute device 104 may determine operands to be sent to a compute engine 406 for future operations by the compute engine 406. The cloud compute device 104 may determine operands in any suitable manner. For example, the shapeshifter 404 may receive an instruction from the compute engine 406 to prepare a particular operand in block 1012. The compute engine 406 may instruct the shapeshifter 404 to prepare a particular operand in any suitable manner. For example, in one embodiment, the compute engine 406 may execute an instruction of an instruction set architecture indicating an operand that should be created, including an indication of which slot values of ciphertext blocks stored in the cache 404 should be present in which slots of the operand to be prepared. In another embodiment, an instruction of an instruction set architecture may indicate that a pre-specified bit mask and degree of replication should be performed on a ciphertext block.

The cloud compute device 104 may determine a future operand based on a spatial or temporal locality to a previous or current operand in block 1016. In some embodiments, some operands, such as parameters for a function of a workload, may be provided in plaintext along with information indicative of the spatial and temporal locality of other operands that will be used. In one embodiment, the cloud compute device 104 may create an operand for the next filter to be applied in a convolutional neural network in block 1016.

The operand to be created may be any suitable combination of slots of ciphertext blocks stored in the cache memory 404, the memory 304, or other component of the cloud compute device 104. As discussed above, an operand may include a ciphertext block, with the ciphertext block being made up of several slots that each be operated on simultaneously, in a similar manner to a single instruction multiple data (SIMD) instruction. The requested operand may be made up of, e.g., one ciphertext block that has had a mask applied to it, a ciphertext block that has had a value from one slot copied to some or all of the other slots, a ciphertext block that has slots copied from different ciphertext blocks, etc.

In block 1018, the cloud compute device 104 performs one or more shapeshifting operations to a ciphertext block in order to prepare the future operands. The cloud compute device 104 may perform shapeshifting operations such as copying to or from slots of a ciphertext block, shift slots of a ciphertext block, applying a mask, or other packing or unpacking operations. The cloud compute device 104 may extract a cipher value from a slot of a ciphertext block in block 1020. The cloud compute device 104 may combine values from slots in different ciphertext blocks to different slots in the same ciphertext block in block 1022. The cloud compute device 104 may perform mask operations in block 1024, and the cloud compute device 104 may perform rotate and add operations in block 1026. In the illustrative embodiment, the shapeshifting may be performed by the shapeshifter 408 (or shapeshifter 504 or shapeshifter 604). In other embodiments, some or all of the shapeshifting may be performed by other components of the cloud compute device 104, such as the processor 302.

For example, in one embodiment, the workload may be an image recognition algorithm using a convolutional neural network. The convolution operation involves multiply accumulate operations of image pixels with a filter that extracts specific features from the image. In the convolutional neural network, each of a large number of filters may be applied to the image pixels. Such an operation for a single filter can be done by creating one operand of image pixels and a second operand with the filter appearing in every slot of the ciphertext block. By performing a multiplication operation, the cloud compute device multiplies the value of each slot of the first operand's ciphertext block by the corresponding value of a slot of the second operand's ciphertext block, and, in this manner, the filter can be applied to the image.

However, the client compute device 102 sending an operand that has a single filter value repeated for each slot would require a large of network bandwidth, storage space, and internal I/O bandwidth on the cloud compute device 104. To avoid that, the client compute device 102 can send a large number of filters, such as over 10,000 filters, in a single ciphertext block. In block 1018, the cloud compute device 104 can extract one filter value from a slot in a ciphertext block and copy it to each slot in a ciphertext block, such as by using the approach shown in FIG. 10. It should be appreciated that, by sending over 10,000 values in a single ciphertext block that would otherwise each be in their own ciphertext block, the client compute device 102, the storage and bandwidth requirements would decrease by a factor of more than 10,000.

It should also be appreciated that, in the illustrative embodiment, the preparation of an operand in block 1018 may be performed while the compute engine 406 that the operand is being sent to is performing other operations. As such, the preparation of the operand can reduce latency in the operation of the compute engine 406.

Figure 11:
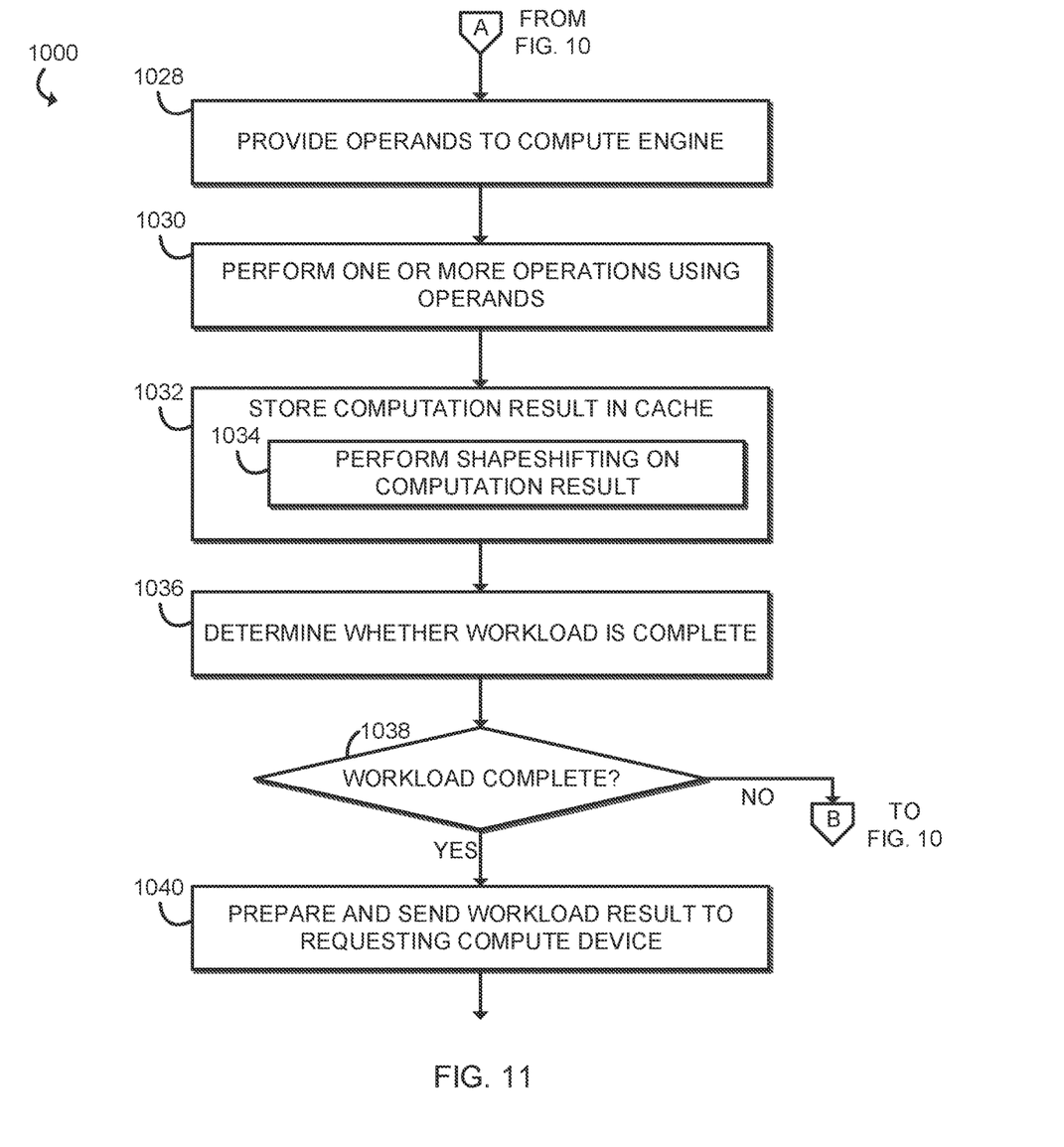

Referring now to FIG. 11, in block 1028, the cloud compute device 104 provides the operands to the compute engine, such as by sending it over an I/O channel. In block 1030, the cloud compute device 104 performs one or more operations using the operands.

In block 1032, the cloud compute device 104 stores a result of the computation in the cache memory 404. In some embodiments, the cloud compute device 104 performs shapeshifting on the computation result.

In block 1036, the cloud compute device 104 determines whether the workload is complete. In block 1038, if the workload is not complete, the method 1000 loops back to block 1010 in FIG. 10 to determine operands for future operation. It should be appreciated that the operands may be determined in block 1010 as operations are being performed in block 1030.

Referring back to block 1038, if the workload is complete, the method 1000 proceeds to block 1040, in which the cloud compute device 104 prepares and sends the workload results to the client compute device 102.

EXAMPLES

Illustrative examples of the technologies disclosed herein are provided below. An embodiment of the technologies may include any one or more, and any combination of, the examples described below.

Example 1 includes a homomorphic encryption processor, the homomorphic encryption processor comprising a cache memory to store one or more ciphertext blocks; one or more compute engines communicatively coupled to the cache memory; shapeshifter circuitry to create an operand for a future compute operation on the one or more compute engines, wherein to create the operand comprises to create an operand ciphertext block based on the one or more ciphertext blocks in parallel with performance of a current compute operation on the one or more compute engines; and send the operand to the one or more compute engines, wherein the one or more compute engines are to perform the future operation with use of the operand.

Example 2 includes the subject matter of Example 1, and wherein to create the operand comprises to apply a mask to one of the one or more ciphertext blocks to create a masked ciphertext block.

Example 3 includes the subject matter of any of Examples 1 and 2, and wherein to create the operand further comprises to perform a rotate operation on the masked ciphertext block.

Example 4 includes the subject matter of any of Examples 1-3, and wherein to create the operand comprises to copy a value of a slot of a first ciphertext block of the one or more ciphertext blocks to each slot of the operand ciphertext block.

Example 5 includes the subject matter of any of Examples 1-4, and wherein the first ciphertext block of the one or more ciphertext blocks comprises a plurality of filters of a convolutional neural network, wherein a second ciphertext block of the one or more ciphertext blocks comprises pixels of a channel of an image to be processed by the homomorphic encryption processor, wherein copying the value of the slot of the first ciphertext block to each slot of the operand ciphertext block comprises copying a filter of the plurality of filters to each slot of the operand ciphertext block, wherein the one or more compute engines are to perform a compute operation with use of the operand to apply the filter to the pixels of the channel of the image to be processed.

Example 6 includes the subject matter of any of Examples 1-5, and wherein the shapeshifter circuitry is to receive an instruction from the one or more compute engines to create the operand, wherein the instruction indicates which slot values of the one or more ciphertext blocks should be in which slots of the operand.

Example 7 includes the subject matter of any of Examples 1-6, and wherein the shapeshifter circuitry is further to create a second operand based on a temporal or spatial locality of data in a current operand of the current compute operation.

Example 8 includes a compute device for performance of operations on homomorphically encrypted data, the compute device comprising a processor; a memory communicatively coupled to the processor; one or more computer-readable media comprising a plurality of instructions stored thereon that, when executed by the compute device, cause the compute device to receive, from a remote compute device, one or more ciphertext blocks, wherein each of the one or more ciphertext blocks is homomorphically encrypted, wherein each of the one or more ciphertext blocks includes a plurality of ciphertext slot values; create a first operand with use of a first ciphertext slot value of the plurality of ciphertext slot values of a first ciphertext block of the one or more ciphertext blocks; create a second operand with use of a second ciphertext slot value of the plurality of ciphertext slot values of the first ciphertext block of the one or more ciphertext blocks, wherein the first operand is different from the second operand and wherein the second ciphertext slot value is different from the first ciphertext slot value; perform a first operation on homomorphically encrypted data with use of the first operand; and perform a second operation on homomorphically encrypted data with use of the second operand.

Example 9 includes the subject matter of Example 8, and wherein to create the first operand comprises to create the second operand in parallel with performance of the first operation.

Example 10 includes the subject matter of any of Examples 8 and 9, and wherein to create the first operand with use of the first ciphertext slot value comprises to copy the first ciphertext slot value to each slot value of the operand ciphertext block.

Example 11 includes the subject matter of any of Examples 8-10, and wherein the first ciphertext block comprises a plurality of filters of a convolutional neural network, wherein a second ciphertext block of the one or more ciphertext blocks comprises pixels of a channel of an image to be processed by the compute device, wherein to copy the first ciphertext slot value to each slot value of the operand ciphertext block comprises to copy a filter of the plurality of filters to each slot value of the operand ciphertext block, wherein to perform the first operation comprises to apply the filter to the pixels of the channel of the image to be processed.

Example 12 includes the subject matter of any of Examples 8-11, and wherein each of the one or more ciphertext blocks is encrypted based on a lattice-based cryptographic scheme.

Example 13 includes the subject matter of any of Examples 8-12, and wherein the lattice-based cryptographic scheme is based on ring learning with errors.

Example 14 includes the subject matter of any of Examples 8-13, and further including a homomorphic encryption processor comprising cache memory to store one or more ciphertext blocks; one or more compute engines communicatively coupled to the cache memory; and shapeshifter circuitry, wherein the plurality of instructions causes the shapeshifter circuitry to create the first operand and create the second operand, wherein the plurality of instructions causes the one or more compute engines to perform the first operation and perform the second operation.

Example 15 includes the subject matter of any of Examples 8-14, and wherein the plurality of instructions causes the shapeshifter circuitry to create the first operand by applying a mask to one of the one or more ciphertext blocks to create a masked ciphertext block.

Example 16 includes a system comprising the compute device of any of Examples 8-15, further comprising the remote compute device, the remote compute device comprising a processor; a memory communicatively coupled to the processor of the remote compute device; one or more computer-readable media comprising a plurality of instructions stored thereon that, when executed by the remote compute device, causes the remote compute device to determine a plurality of workload parameters for a workload; pack the plurality of workload parameters into one plaintext block, wherein the plurality of workload parameters are to be used in different operands during execution of the workload; encrypt the plaintext block to a ciphertext block with use of a homomorphic encryption algorithm, wherein the ciphertext block is one of the one or more ciphertext blocks; and send the encrypted ciphertext block to the compute device for execution of the workload.

Example 17 includes the subject matter of Example 16, and wherein the plurality of instruction of the remote compute device further cause the remote compute device to encrypt pixels of a channel of an image to be processed by the compute device to a second ciphertext block, wherein the plurality of workload parameters packed into the one ciphertext block comprise a plurality of filters of a convolutional neural network, wherein each filter of the plurality of filters is to be applied to all pixels of the channel of the image to be processed.

Example 18 includes one or more computer-readable media comprising a plurality of instructions stored thereon that, when executed, causes a compute device to receive, from a remote compute device, one or more ciphertext blocks, wherein each of the one or more ciphertext blocks is homomorphically encrypted, wherein each of the one or more ciphertext blocks includes a plurality of ciphertext slot values; create a first operand with use of a first ciphertext slot value of the plurality of ciphertext slot values of a first ciphertext block of the one or more ciphertext blocks; create a second operand with use of a second ciphertext slot value of the plurality of ciphertext slot values of the first ciphertext block of the one or more ciphertext blocks, wherein the first operand is different from the second operand and wherein the second ciphertext slot value is different from the first ciphertext slot value; perform a first operation on homomorphically encrypted data with use of the first operand; and perform a second operation on homomorphically encrypted data with use of the second operand.

Example 19 includes the subject matter of Example 18, and wherein to create the first operand comprises to create the second operand in parallel with performance of the first operation.

Example 20 includes the subject matter of any of Examples 18 and 19, and wherein to create the first operand with use of the first ciphertext slot value comprises to copy the first ciphertext slot value to each slot value of the operand ciphertext block.

Example 21 includes the subject matter of any of Examples 18-20, and wherein the first ciphertext block comprises a plurality of filters of a convolutional neural network, wherein a second ciphertext block of the one or more ciphertext blocks comprises pixels of a channel of an image to be processed by the compute device, wherein to copy the first ciphertext slot value to each slot value of the operand ciphertext block comprises to copy a filter of the plurality of filters to each slot value of the operand ciphertext block, wherein to perform the first operation comprises to apply the filter to the pixels of the channel of the image to be processed.

Example 22 includes the subject matter of any of Examples 18-21, and wherein each of the one or more ciphertext blocks is encrypted based on a lattice-based cryptographic scheme.

Example 23 includes the subject matter of any of Examples 18-22, and wherein the lattice-based cryptographic scheme is based on ring learning with errors.

Example 24 includes a compute device for performance of operations on homomorphically encrypted data, the compute device comprising a processor; a memory communicatively coupled to the processor; one or more computer-readable media comprising a plurality of instructions stored thereon that, when executed by the compute device, cause the compute device to determine a plurality of workload parameters for a workload; pack the plurality of workload parameters into one plaintext block, wherein the plurality of workload parameters are to be used in different operands during execution of the workload; encrypt the plaintext block to a ciphertext block with use of a homomorphic encryption algorithm; and send the encrypted ciphertext block to a remote compute device for execution of the workload.

Example 25 includes the subject matter of Example 24, and wherein the plurality of instruction further causes the compute device to encrypt pixels of a channel of an image to be processed by the remote compute device to a second ciphertext block, wherein the plurality of workload parameters packed into the one ciphertext block comprise a plurality of filters of a convolutional neural network, wherein each filter of the plurality of filters is to be applied to all pixels of the channel of the image to be processed.

Example 26 includes a homomorphic encryption processor, the homomorphic encryption processor comprising a cache memory to store one or more ciphertext blocks; one or more compute engines communicatively coupled to the cache memory; means for creating an operand for a future compute operation on the one or more compute engines, wherein to create the operand comprises to create an operand ciphertext block based on the one or more ciphertext blocks in parallel with performance of a current compute operation on the one or more compute engines; and means for sending the operand to the one or more compute engines, means for performing the future operation with use of the operand.

Example 27 includes the subject matter of Example 26, and wherein the means for creating the operand comprises means for applying a mask to one of the one or more ciphertext blocks to create a masked ciphertext block.

Example 28 includes the subject matter of any of Examples 26 and 27, and wherein the means for creating the operand further comprises performing a rotate operation on the masked ciphertext block.

Example 29 includes the subject matter of any of Examples 26-28, and wherein the means for creating the operand comprises means for copying a value of a slot of a first ciphertext block of the one or more ciphertext blocks to each slot of the operand ciphertext block.

Example 30 includes the subject matter of any of Examples 26-29, and wherein the first ciphertext block of the one or more ciphertext blocks comprises a plurality of filters of a convolutional neural network, wherein a second ciphertext block of the one or more ciphertext blocks comprises pixels of a channel of an image to be processed by the homomorphic encryption processor, wherein the means for copying the value of the slot of the first ciphertext block to each slot of the operand ciphertext block comprises means for copying a filter of the plurality of filters to each slot of the operand ciphertext block, further comprising means for performing a compute operation with use of the operand to apply the filter to the pixels of the channel of the image to be processed.

Example 31 includes the subject matter of any of Examples 26-30, and further including means for receiving an instruction from the one or more compute engines to create the operand, wherein the instruction indicates which slot values of the one or more ciphertext blocks should be in which slots of the operand.

Example 32 includes the subject matter of any of Examples 26-31, and further including means for creating a second operand based on a temporal or spatial locality of data in a current operand of the current compute operation.

Example 33 includes a compute device for performance of operations on homomorphically encrypted data, the compute device comprising means for receiving, from a remote compute device, one or more ciphertext blocks, wherein each of the one or more ciphertext blocks is homomorphically encrypted, wherein each of the one or more ciphertext blocks includes a plurality of ciphertext slot values; means for creating a first operand with use of a first ciphertext slot value of the plurality of ciphertext slot values of a first ciphertext block of the one or more ciphertext blocks; means for creating a second operand with use of a second ciphertext slot value of the plurality of ciphertext slot values of the first ciphertext block of the one or more ciphertext blocks, wherein the first operand is different from the second operand and wherein the second ciphertext slot value is different from the first ciphertext slot value; means for performing a first operation on homomorphically encrypted data with use of the first operand; and means for performing a second operation on homomorphically encrypted data with use of the second operand.

Example 34 includes the subject matter of Example 33, and wherein the means for creating the first operand comprises means for creating the second operand in parallel with performance of the first operation.

Example 35 includes the subject matter of any of Examples 33 and 34, and wherein means for creating the first operand with use of the first ciphertext slot value comprises means for copying the first ciphertext slot value to each slot value of the operand ciphertext block.

Example 36 includes the subject matter of any of Examples 33-35, and wherein the first ciphertext block comprises a plurality of filters of a convolutional neural network, wherein a second ciphertext block of the one or more ciphertext blocks comprises pixels of a channel of an image to be processed by the compute device, wherein the means for copying the first ciphertext slot value to each slot value of the operand ciphertext block comprises means for copying a filter of the plurality of filters to each slot value of the operand ciphertext block, wherein the means for performing the first operation comprises means for applying the filter to the pixels of the channel of the image to be processed.

Example 37 includes the subject matter of any of Examples 33-36, and wherein each of the one or more ciphertext blocks is encrypted based on a lattice-based cryptographic scheme.

Example 38 includes the subject matter of any of Examples 33-37, and wherein the lattice-based cryptographic scheme is based on ring learning with errors.

Example 39 includes the subject matter of any of Examples 33-38, and further including a homomorphic encryption processor comprising cache memory to store one or more ciphertext blocks; one or more compute engines communicatively coupled to the cache memory; and shapeshifter circuitry to create the first operand and create the second operand, wherein the one or more compute engines are to perform the first operation and perform the second operation.

Example 40 includes the subject matter of any of Examples 33-39, and wherein the shapeshifter circuitry is further to create the first operand by applying a mask to one of the one or more ciphertext blocks to create a masked ciphertext block.

Example 41 includes a system comprising the compute device of any of Examples 33-40, further comprising the remote compute device, the remote compute device comprising means for determining a plurality of workload parameters for a workload; means for packing the plurality of workload parameters into one plaintext block, wherein the plurality of workload parameters are to be used in different operands during execution of the workload; means for encrypting the plaintext block to a ciphertext block with use of a homomorphic encryption algorithm, wherein the ciphertext block is one of the one or more ciphertext blocks; and means for sending the encrypted ciphertext block to the compute device for execution of the workload.

Example 42 includes the subject matter of Example 41, and wherein the remote compute device further comprises means for encrypting pixels of a channel of an image to be processed by the compute device to a second ciphertext block, wherein the plurality of workload parameters packed into the one ciphertext block comprise a plurality of filters of a convolutional neural network, wherein each filter of the plurality of filters is to be applied to all pixels of the channel of the image to be processed.

Example 43 includes a compute device for performance of operations on homomorphically encrypted data, the compute device comprising means for determining a plurality of workload parameters for a workload; means for packing the plurality of workload parameters into one plaintext block, wherein the plurality of workload parameters are to be used in different operands during execution of the workload; means for encrypting the plaintext block to a ciphertext block with use of a homomorphic encryption algorithm; and means for sending the encrypted ciphertext block to a remote compute device for execution of the workload.

Example 44 includes the subject matter of Example 43, and further including means for encrypting pixels of a channel of an image to be processed by the remote compute device to a second ciphertext block, wherein the plurality of workload parameters packed into the one ciphertext block comprise a plurality of filters of a convolutional neural network, wherein each filter of the plurality of filters is to be applied to all pixels of the channel of the image to be processed.

The invention claimed is:

1. A homomorphic encryption processor comprising:
a memory to store one or more ciphertext blocks;
one or more compute engines communicatively coupled to the memory; and
shapeshifter circuitry to:
create an operand for a first compute operation on the one or more compute engines, wherein to create the operand comprises to create an operand ciphertext block based on the one or more ciphertext blocks in parallel with performance of a second compute operation on the one or more compute engines, wherein to create the operand comprises to apply a mask to one of the one or more ciphertext blocks to create a masked ciphertext block; and
send the operand to the one or more compute engines, wherein the one or more compute engines are to perform the first operation with use of the operand.

2. The homomorphic encryption processor of claim 1, wherein to create the operand further comprises to perform a rotate operation on the masked ciphertext block.

3. The homomorphic encryption processor of claim 1, wherein the shapeshifter circuitry is to receive an instruction from the one or more compute engines to create the operand, wherein the instruction indicates which slot values of the one or more ciphertext blocks should be in which slots of the operand.

4. The homomorphic encryption processor of claim 1, wherein the shapeshifter circuitry is further to create a second operand based on a temporal or spatial locality of data in a second operand of the current compute operation.

5. A compute device for performance of operations on homomorphically encrypted data, the compute device comprising:
a processor;
a memory communicatively coupled to the processor; and
one or more non-transitory computer-readable media comprising a plurality of instructions stored thereon that, when executed by the compute device, cause the compute device to:
receive, from a remote compute device, one or more ciphertext blocks, wherein each of the one or more ciphertext blocks is homomorphically encrypted, wherein each of the one or more ciphertext blocks includes a plurality of ciphertext slot values;
create a first operand with use of a first ciphertext slot value of the plurality of ciphertext slot values of a first ciphertext block of the one or more ciphertext blocks;
create a second operand with use of a second ciphertext slot value of the plurality of ciphertext slot values of the first ciphertext block of the one or more ciphertext blocks, wherein the first operand is different from the second operand and wherein the second ciphertext slot value is different from the first ciphertext slot value;
perform a first operation on homomorphically encrypted data with use of the first operand; and perform a second operation on homomorphically encrypted data with use of the second operand; and
a homomorphic encryption processor comprising:
cache memory to store one or more ciphertext blocks;
one or more compute engines communicatively coupled to the cache memory; and
shapeshifter circuitry,
wherein the plurality of instructions causes the shapeshifter circuitry to create the first operand and create the second operand,
wherein the plurality of instructions causes the one or more compute engines to perform the first operation and perform the second operation, wherein the plurality of instructions are to cause the shapeshifter circuitry to create the first operand by applying a mask to one of the one or more ciphertext blocks to create a masked ciphertext block.

6. The compute device of claim 5, wherein to create the first operand comprises to create the second operand in parallel with performance of the first operation.

7. The compute device of claim 5, wherein to create the first operand with use of the first ciphertext slot value comprises to copy the first ciphertext slot value to each slot value of the operand ciphertext block.

8. The compute device of claim 7, wherein the first ciphertext block comprises a plurality of filters of a convolutional neural network, wherein a second ciphertext block of the one or more ciphertext blocks comprises pixels of a channel of an image to be processed by the compute device,
wherein to copy the first ciphertext slot value to each slot value of the operand ciphertext block comprises to copy a filter of the plurality of filters to each slot value of the operand ciphertext block,
wherein to perform the first operation comprises to apply the filter to the pixels of the channel of the image to be processed.

9. The compute device of claim 5, wherein each of the one or more ciphertext blocks is encrypted based on a lattice-based cryptographic scheme.

10. The compute device of claim 9, wherein the lattice-based cryptographic scheme is based on ring learning with errors.

11. A compute device for performance of operations on homomorphically encrypted data, the compute device comprising:
a processor;
a memory communicatively coupled to the processor; and
one or more non-transitory computer-readable media comprising a plurality of instructions stored thereon that, when executed by the compute device, cause the compute device to:
determine a plurality of workload parameters for a workload;
pack the plurality of workload parameters into one plaintext block, wherein the plurality of workload parameters are to be used in different operands during execution of the workload;
encrypt the plaintext block to a ciphertext block with use of a homomorphic encryption algorithm;
send the encrypted ciphertext block to a remote compute device for execution of the workload; and
encrypt pixels of a channel of an image to be processed by the remote compute device to a second ciphertext block, wherein the plurality of workload parameters packed into the one ciphertext block comprise a plurality of filters of a convolutional neural network, wherein each filter of the plurality of filters is to be applied to all pixels of the channel of the image to be processed.

* * * * *